United States Patent [19]

Hillier

[11] Patent Number: 4,729,283

[45] Date of Patent: Mar. 8, 1988

[54] VALVE FOR USE WITH HYDRAULIC RAM ASSEMBLIES

[75] Inventor: Raymond G. Hillier, Runaway Bay, Australia

[73] Assignee: Delibes Pty. Ltd., Australia

[21] Appl. No.: 926,827

[22] Filed: Nov. 3, 1986

Related U.S. Application Data

[63] Continuation of Ser. No. 670,287, Nov. 9, 1984, abandoned.

[51] Int. Cl.⁴ .............................. F01L 15/00
[52] U.S. Cl. .................... 91/189 R; 91/401; 91/520; 137/614.11
[58] Field of Search ............ 91/189 R, 191, 192, 91/224, 229, 399, 401, 520; 92/81, 181 P; 267/33; 137/614.11, 614.13, 614.14, 516.25, 516.27

[56] References Cited

U.S. PATENT DOCUMENTS

| | | | |
|---|---|---|---|
| 3,240,008 | 3/1966 | McMullen | 91/401 |
| 3,257,910 | 6/1966 | Gates | 91/224 |
| 3,476,016 | 11/1969 | Dixon | 91/520 |
| 3,791,412 | 2/1974 | Mays | 137/614.11 |
| 3,804,557 | 4/1974 | Bentley | 91/229 |
| 3,861,661 | 1/1975 | Yazaki | 267/33 |
| 3,977,700 | 8/1976 | Leaf | 267/33 |
| 3,991,832 | 11/1976 | Cooper | 91/401 |
| 4,023,363 | 5/1977 | Liebert | 91/401 |
| 4,243,106 | 1/1981 | Skubich | 91/520 |
| 4,478,129 | 10/1984 | Hannes | 91/189 R |
| 4,531,451 | 7/1985 | Mouton | 91/520 |

Primary Examiner—Abraham Hershkovitz
Attorney, Agent, or Firm—Larson and Taylor

[57] ABSTRACT

This invention relates to a valve suitable for location within a passage or bore of a piston or piston rod of a hydraulic ram assembly. The valve includes a valve body mountable in the bore or passage and a chamber provided in the valve body having a pair of fluid access ports preferably having a relatively narrow outer passage and an enlarged inner space which may function as a valve seat. There is also provided a pair of valve members wherein each valve member may co-operate with a respective valve seat to close or open same to fluid flow through the valve chamber. The arrangement is such that in operation fluid flow into the valve chamber may occur only from the pressure side of a piston or piston rod accommodating the rod through a proximal access port wherein a distal access port is closed whereby prior to impact of the piston upon an end of an associated hydraulic cylinder the distal access port is opened to permit fluid flow to occur therethrough to the non pressure side of the piston from the valve chamber.

6 Claims, 16 Drawing Figures

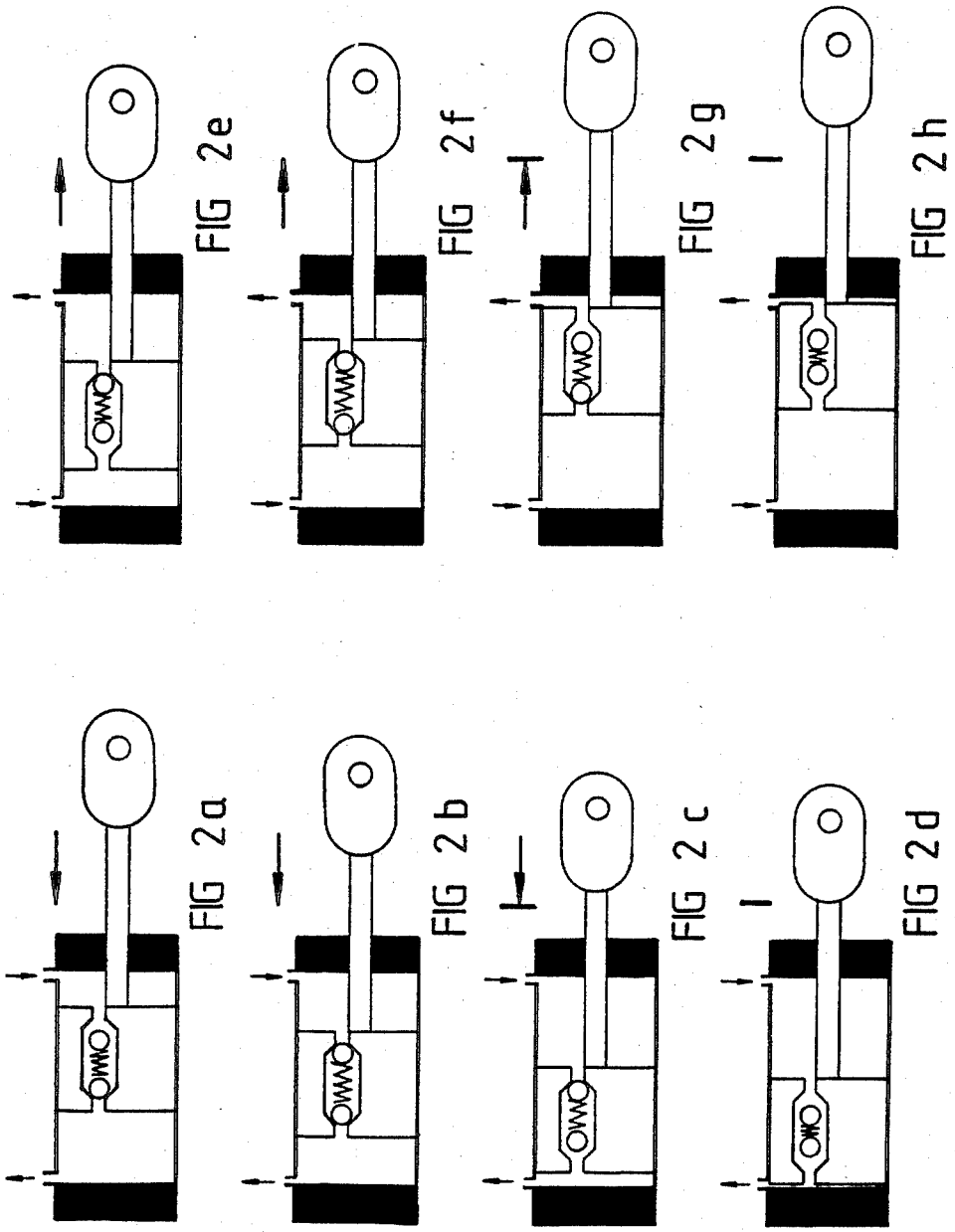

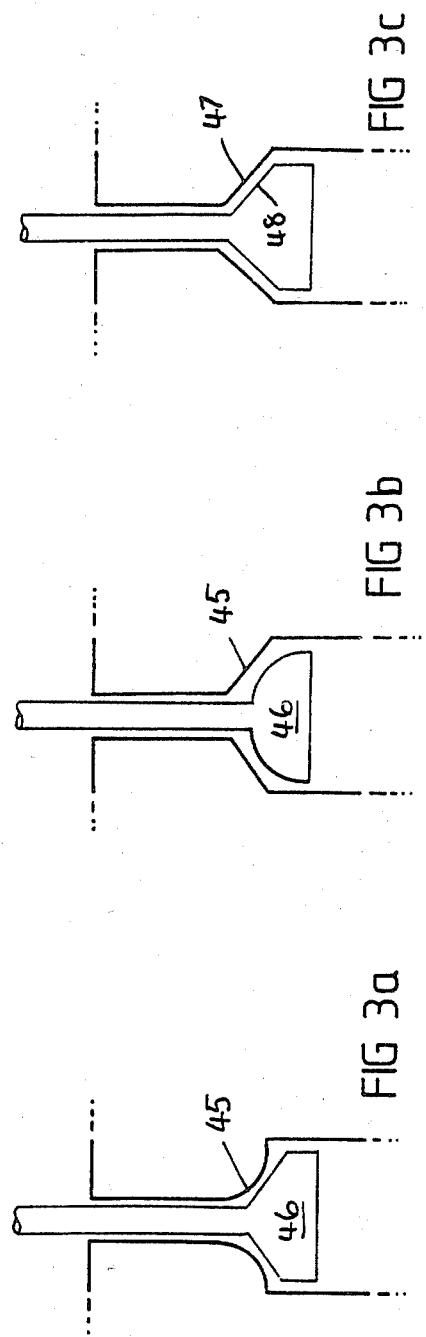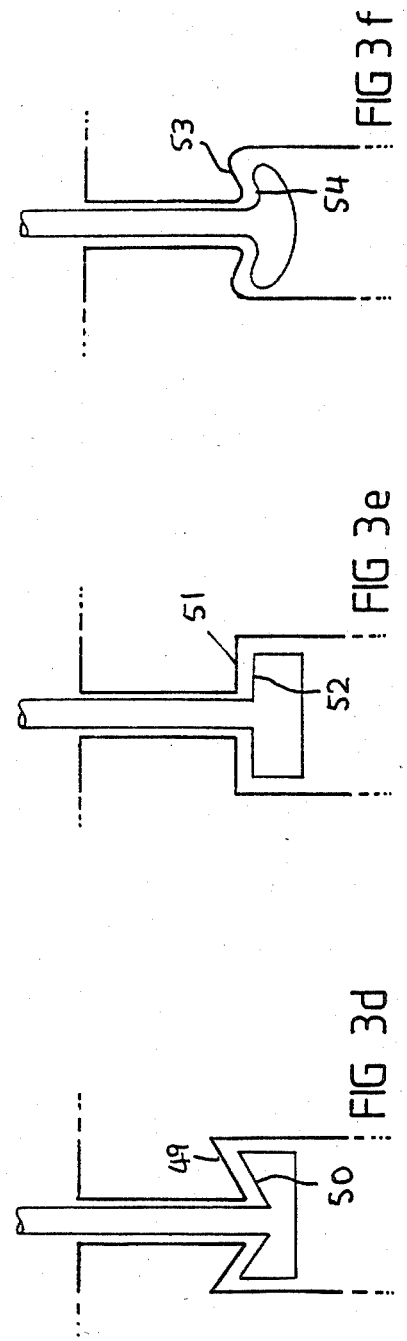

VALVE FOR USE WITH HYDRAULIC RAM ASSEMBLIES

This application is a continuation, of application Ser. No. 670,287 filed Nov. 9, 1984, now abandoned

BACKGROUND OF THE INVENTION

1. Field of the Invention

This invention relates to a valve for use with hydraulic ram assemblies and in particular to a valve for use in inhibition of fluid bypass through the piston especially when a plurality of hydraulic ram assemblies are connected in series.

When a plurality of hydraulic ram assemblies are connected in series with a conduit interconnecting an outlet port of a respective hydraulic ram assembly to an inlet port of an adjacent hydraulic ram assembly effective operation of the plurality of hydraulic ram assemblies can be adversely effected if bypass of hydraulic fluid occurs past the piston seals or for any other reason bypass or leakage of fluid may occur between the pressure side of the piston and the non-pressure side. This means that the relative positions of the respective pistons in each hydraulic cylinder can alter and thus proper and effective sequencing of fluid flow between adjoining pistons is impaired.

2. Description of the Prior Art

Fluid leakage or bypass through the piston may occur through mechanical reasons, seal faults, or excess pressure being applied.

Various attempts have been made to solve this particular problem and they have included the provisions of grooves in the internal surface of the hydraulic cylinder wherein fluid may pass through or pass the piston connecting both sides during piston movement. There has also been the provision of check valves located in the piston or piston rod which are operated by spring loading or which alternatively are pushrod actuated but such check valves may only open in a direction opposing pressure thus allowing an interchange of fluid between the non-pressure side and the pressure side of the piston. However the major problem with these remedies was that fluid bypass still had a tendency to occur when the piston changed direction after reaching one end of the hydraulic cylinder from either a shock loading, or through an intentionally high operational loading or until the pushrod has ceased to contact the end of the hydraulic cylinder. Thus under these conditions the sudden or abrupt change in direction of the piston in the cylinder was responsible for reverse flow or bypass of fluid to occur from the non-pressure side of the piston to the pressure side before and/or after impact or contact with the pushrod and cylinder end.

In the case of a check valve or spring loaded ball valve under high load conditions, often the ball was separated from its accommodating seat before and/or after impact and thus fluid leakage could occur.

It also had to be borne in mind in regard to the check valves described above that they were ineffective in preventing fluid bypass through the piston or piston rod from the pressure side to the non-pressure side.

It is therefore an object of the invention to provide a valve for use in hydraulic ram assemblies capable of alleviating fluid leakage or bypass through the piston and thus minimizing the problems associated with the prior art.

SUMMARY OF THE INVENTION

The valve of the invention is suitable for location within a passage or bore of a piston or piston rod of a hydraulic ram assembly and includes:

a valve body mountable in said bore or passage;

a chamber provided in said valve body having a pair or fluid access ports; and a pair of valve members wherein each valve member is associated with a respective access port to close or open same to fluid flow through the valve chamber whereby in operation fluid flow into said chamber may occur only from the pressure side of a piston or piston rod accommodating said valve through a proximal access port wherein a distal access port is closed whereby prior to impact of said piston upon an end of an associated hydraulic cylinder said distal access port is opened to permit fluid flow to occur therethrough to the non-pressure side of the piston from said valve chamber.

The invention also includes within its scope a hydraulic ram assembly incorporating said valve.

Preferably the valve body is substantially cylindrical although it may comprise any suitable shape. Suitably it may be integral, or more preferably formed from two abutting components including a non-threaded or plain component which is permanently mounted in the bore in the piston and a threaded component mounted in the bore for releasable disengagement therefrom when required for maintenance purposes.

The valve chamber again may comprise any suitable shape but suitably it is elongate and has opposed restricted end portions. Preferably each access port is provided in each end portion.

Suitably each access port is relatively narrow adjacent an associated end of the piston and also includes an enlarged space remote from said end which may function as a valve seat as hereinafter described.

Each valve member suitably comprises a T shaped member with the head of the T occupying the enlarged space of the access port and the shank of the T occupying the narrow space of the access port with an outer or free end of the shank extending outwardly from the access port into the interior of the hydraulic cylinder. Thus in this embodiment the enlarged space of the access port functions as a valve seat for the head of the T shaped member.

Preferably there is provided biasing means associated with each valve member whereby each valve member is biassed to the closed position where the valve member is retained within its accommodating valve seat.

In a more preferred form of the invention there is provided a spring which is suitably a helical compression spring which extends between each valve member and thus provides a single biasing means for each valve member although separate biasing means for each valve member could be utilized if required.

More preferably however there is provided a pair of balls located in the valve chamber wherein each ball is retained in an accommodating seat portion of the valve chamber. Each ball may be located at each end of a suitable resilient cage such as a helical compression spring and in the closed position abuts the head of an adjacent T shaped valve member as described above.

There also may be provided a resilient member such as a rubber insert which is located and retained in the resilient cage. This is useful for preventing "hydraulic lock" occurring under abnormal working conditions where the pressure in the chamber may exceed the pressure in the hydraulic cylinder. In this situation, both steel balls may be held fast against their accommodating seats. In this situation the resilient member may deform and thus decrease the chamber pressure and thus release the valve chamber from a "hydraulic lock" situation. Suitably the resilient member is securely retained in the helical spring to prevent it becoming loose and lodging in a valve seat.

Reference may now be made to a preferred embodiment of the invention as shown in the accompanying drawings which illustrates a valve constructed in accordance with the invention wherein:

BRIEF DESCRIPTION OF THE DRAWINGS

FIGS. 2a-2h illustrate various stages in the method of operation of the valve;

FIGS. 3a-3f illustrate various shapes applicable to the T-shaped valve member and accommodating valve seat.

DETAILED DESCRIPTION OF THE PREFERRED EMBODIMENT

Figure 1:
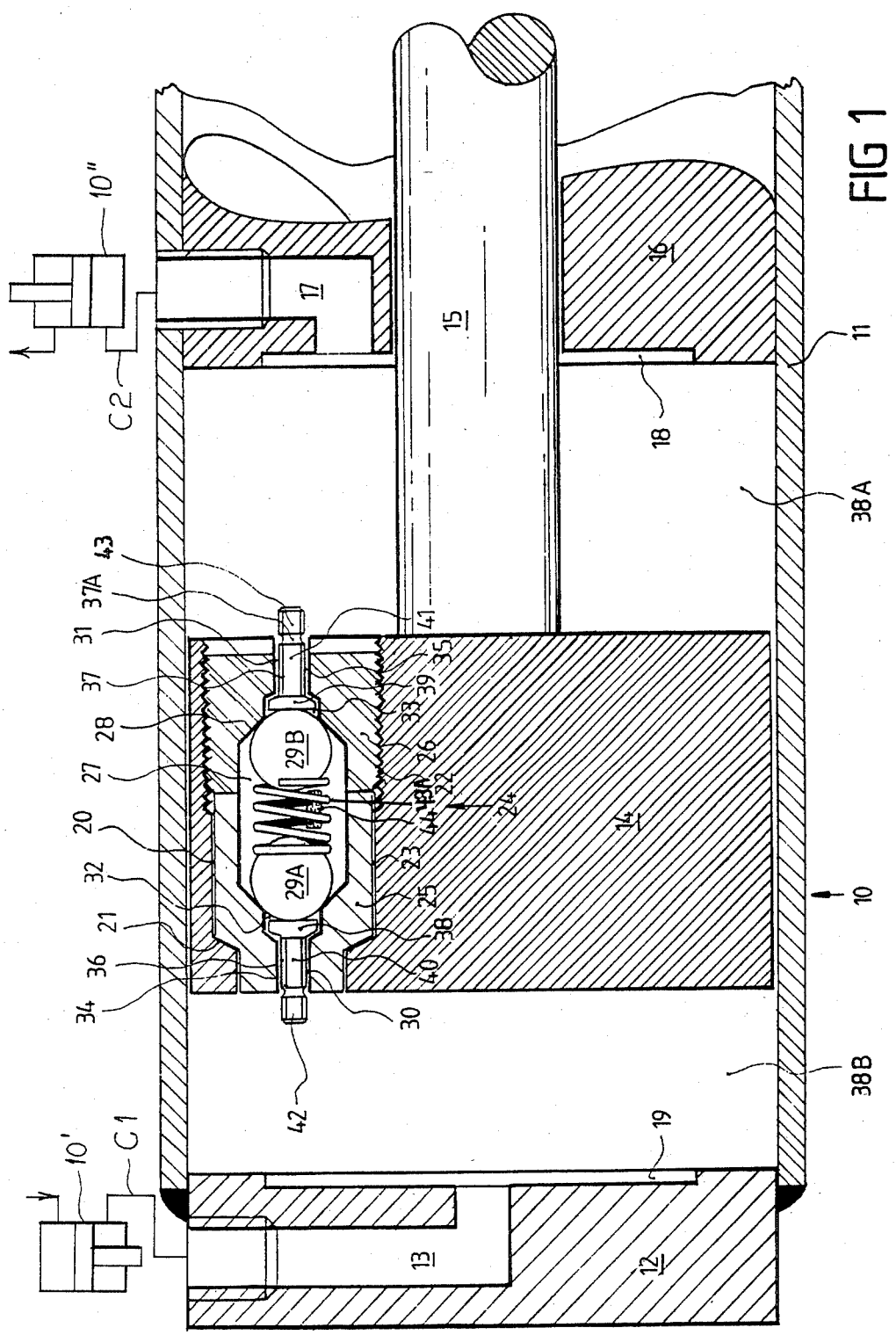
FIG. 1 represents a cross-sectional view of the valve located in a piston in a hydraulic ram assembly.

In the drawings there is shown hydraulic cylinder 10 having side wall 11 and end wall 12 which includes drain or fill passage 13. There is also shown piston 14 which is attached to piston rod or shaft 15. Also shown is piston rod bush 16 which includes drain and fill passage 17. Piston rod bush 16 also includes recess 18 and end wall 12 may also include recess 19.

There is provided in piston 14 a bore 20 having a tapered portion 21. Bore 20 also includes a threaded portion 22 and a non-threaded portion 23.

There is also shown valve body 24 comprising plain or unthreaded component 25, of complementary dimensions to portion 23, and threaded component 26 which is releasably engaged with bore 20 at portion 22.

Component 25 may be permanently retained and pressure sealed in portion 23 of bore 20 by the use of bonding agent which is suitably applied in the region of tapered portion 21. Tapered portion 21 facilitates the retention of component 25 in portion 23 as shown.

There is also shown valve chamber 27 having tapered portions 28 which act as seats for balls 29A and 29B. There are also shown access ports 30 and 31, each having enlarged spaces 32 and 33 and narrow spaces or passages 34 and 35. Also shown are valve members 36 and 37 having head portions 38 and 39 and shanks 40 and 41. Spaces 32 and 33 act as valve seats for head portions 38 and 39 respectively. Each shank 40 and 41 includes an outwardly extending end portion 42 and 43 respectively and a weakening groove 37A. Each end 42 and 43 extends into the interior space of hydraulic cylinder 10. For convenience the space adjacent rod bush 16 is designated 38A and the space adjacent wall 12 is designated 38B.

There is also shown helical compression spring 43A interposed between balls 29A and 29B as shown.

As shown in FIG. 1, hydraulic cylinder 10 is connected in series between the hydraulic cylinders 10' and 10" of adjacent hydraulic ram assemblies by respective conduits C1 and C2.

As illustrated in FIGS. 2a-2h the valve shown in FIG. 1 will function as hereinafter described.

On a forward stroke of the piston 14, FIG. 1, access port 30 is closed with ball 29A hard against its associated seat. Access port 31 will normally be closed. However, due to a sudden loading on the piston 14, the pressure on the pressure side in space 38A may exceed the pressure in chamber 27 and hence ball 29B may unseat allowing fluid to gain access to chamber 27 through port 31. This is shown in FIG. 2a. Upon relaxation of the loading on the pressure side ball 29B may close access port 31. This is shown in FIG. 2b.

FIG. 2c shows the situation wherein the portion 42 of valve member 36 impacts upon end wall 12 of cylinder 10. Therefore ball 29A unseats allowing fluid already in the chamber to flow through to space 38B through access port 30. When this happens the pressure within chamber 27 will be less than in space 38A and ball 29B may also unseat providing a situation when piston 14 impacts against end wall 12 (i.e. it has stopped) where both access ports 30 and 31 are open. This is shown in FIG. 2d.

In FIG. 2e space 38B has now become the pressure side of the piston 14 and fluid is entering space 38B through port 13 and draining through port 17. Again due to a sudden loading on the piston ball 29A may unseat allowing fluid to travel from space 38B through port 30 to within chamber 27. Upon relaxation of this loading ball 29A may seat and this is shown in FIG. 2f. FIGS. 2g and 2h show the situation when piston impacts against rod bush 16 and are a repetition of what has already taken place above concerning FIGS. 2c and 2d. Thus projecting end 43 of valve member 37 will impinge upon the end wall of bush 16 and thus ball 29B will unseat allowing fluid within chamber 27 to flow out of the chamber to space 38A. When this happens of course ball 29B will unseat.

In FIGS. 3a-3f there are shown various shapes of the head of a representative T-shaped valve member for use in the invention as well as a valve seat which will have a corresponding shape. Thus the valve seat 45 may be curved as shown in FIG. 3a and the head 46 of the T shaped member angled as shown. The reverse is shown in FIG. 3b. FIB 3c shows the situation where both the head of the T shaped member and the valve seat are angled having a pair of mutually parallel faces 47 and 48. FIG. 3d shows the situation where both the T shaped member and valve seat have mating reentrant portions 49 and 50. In FIG. 3e there are shown mating square faces 51 and 52 and in FIG. 3f there is shown mating curved portions 53 and 54.

Figure 4:
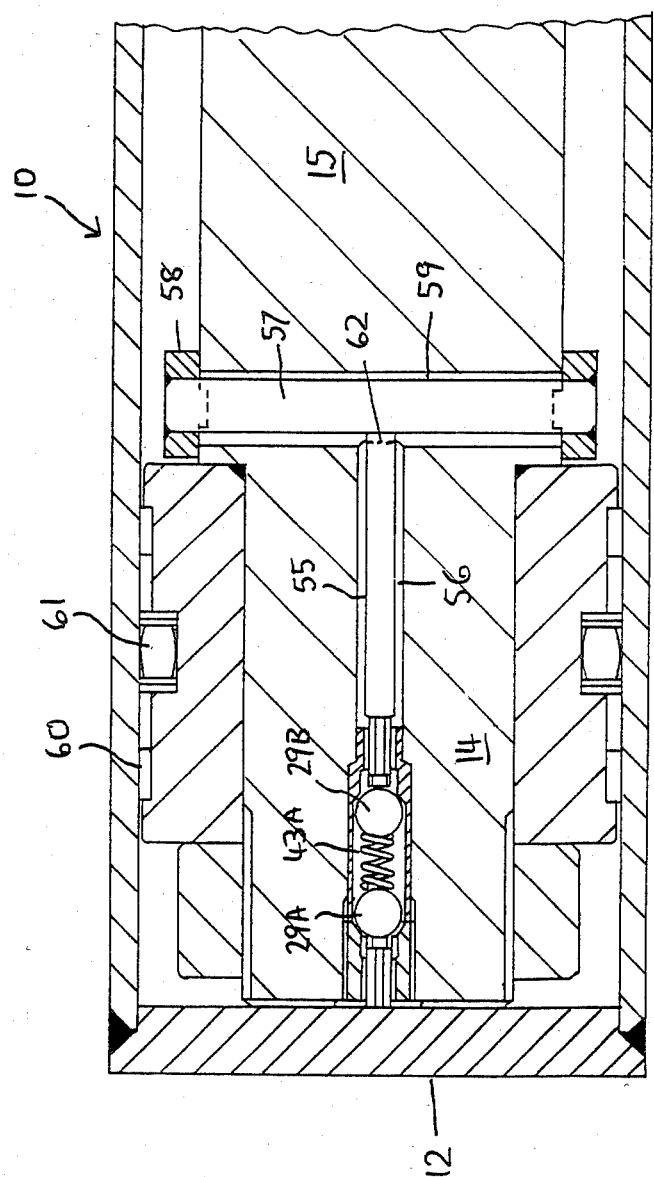
FIG. 4 represents a modified valve constructed in accordance with the invention.

In FIG. 4 a modified valve member is shown which is constructed in accordance with the invention. In this arrangement similar reference numerals have been used as already described in FIG. 1 and thus have the same meanings. However projecting end 43 is provided with a longitudinal extension 55 which extends through a mating passage 56 in piston 14. There is also shown a lateral cross member 57 attached to or integral with longitudinal extension 55 to which is attached a collar 58 spaced from piston 14 as shown.

In operation of this arrangement when collar 58 impacts against bush 16 spring 43A will be depressed and thus ball 29B will unseat. Lateral cross member 57 is spaced from piston 14 as shown within a mating passage 59 so that upon impact of collar 58 against bush 16 cross member 57 will abut piston 14 to thereby unseat ball 29B.

In another variation of this arrangement longitudinal extension 55 may act as a pushrod and extend into passage 59 spaced from cross member 57 and this arrangement is shown in dotted outline in FIG. 4 at 62.

Also shown in FIG. 4 is wear ring 60, "J" seal and back up rings 61.

Thus it will be appreciated that in either a forward or reverse stroke having regard to the drawings the distal access port relative to the pressure side of the piston will be closed and the proximal access port open in normal operation and also under high load conditions therefore effectively eliminating bypass or leakage of fluid through or via the piston.

In the illustrated embodiment above, the hydraulic ram assembly has been of the double acting sequencing variety. However in the case of a single acting sequencing hydraulic ram, one of ends 42 or 43 may be severed at weakening groove 37A and thus ball 29A or 29B will be permanently held in its seat as is the case with the valve member 36 or 37. Since in the case of a single acting sequencing hydraulic ram assembly the pressure side will always remain on the same side of the piston, fluid leakage past the piston is still effectively prevented.

There is also shown rubber element 44 retained within spring 43A which deforms under "hydraulic shock" conditions as previously described and thus this will ensure that one of the access ports will always be open for the valve to operate effectively while under hydraulic pressure.

I claim:

1. An assembly of a plurality of hydraulic ram assemblies connected in series with a conduit interconnecting an output port of a respective ram assembly to an inlet port of an adjacent ram assembly, each said hydraulic ram assembly comprising a hydraulic cylinder, a piston located within said cylinder, and a piston rod connected to said piston, and each of said hydraulic ram assemblies includes a valve assembly located in a mating bore in a respective said piston or piston rod, said valve assembly including:
a valve body;
a valve chamber provided in the valve body communicating with a pair of end passages constituting fluid access ports wherein each end passage is of restricted transverse dimension compared to the valve chamber and comprises a relatively narrow outer passage and an enlarged inner space;
a pair of valve members each associated with a respective end passage which are each substantially T-shaped having an enlarged head portion and a stem whereby in use each stem may extend outwardly from said bore and each head portion may occupy an associated inner space which functions as a valve seat for the adjacent valve member;
a pair of balls in said valve chamber separate from the valve members wherein each ball is held in abutting relationship with an adjacent head portion of a respective valve member in use; and
a biassing member interposed between each of said balls in the valve chamber and exerting a biassing force on each of said balls whereby each valve member is biassed outwardly to closed position;
the construction and arrangement being such that each valve member may close or open a respective fluid access port to fluid flow through the valve chamber whereby in operation fluid flow into said chamber may occur only from the pressure side of the piston or piston rod accommodating said valve assembly through a proximal access port wherein a distal access port is closed whereby prior to impact of said piston or piston rod upon an internal surface of an associated hydraulic ram assembly, said distal access port is opened to permit fluid flow to occur therethrough to the non pressure side of the piston or piston rod from said valve chamber, thereby to inhibit fluid bypass or leakage of fluid between the pressure side and the non pressure side and thus provide effective sequencing of fluid flow between adjoining pistons of adjacent hydraulic ram assemblies in said plurality of hydraulic ram assemblies connected in series.

2. A valve assembly as claimed in claim 1 wherein the valve body includes two abutting components comprising a non-threaded component bonded or permanently mounted in said bore and retained in place by a retaining abutment and a threaded component mounted in the bore for releasable disengagement therefrom.

3. A valve assembly as claimed in claim 1 wherein said biassing means includes a helical compression spring.

4. A valve assembly as claimed in claim 3 wherein there is provided a deformable resilient insert located and retained with the spring,
which insert upon deformation decreases the valve chamber pressure to release each ball from a locked position in a "hydraulic lock" situation.

5. An assembly as claimed in claim 1 wherein each hydraulic ram assembly includes a cylinder access port located at or adjacent to one end of the cylinder and a rod bush also including an access port associated therewith at an end of the hydraulic cylinder remote from said one end.

6. A valve assembly for use in inhibition of fluid bypass through a piston or piston rod of a hydraulic ram assembly when a plurality of hydraulic ram assemblies are connected in series, said valve assembly including a valve body;
a valve chamber provided in the valve body communicating with a pair of end bores constituting fluid access ports wherein each end bore is of restricted transverse dimension compared to the valve chamber and comprises a relatively narrow outer passage and an enlarged inner space;
a pair of valve members each associated with a respective end bore and each of which are substantially T-shaped having an enlarged head portion adapted to seat in said enlarged inner space which functions as a valve seat for the adjacent valve member and a stem loosely fitted within said passage whereby in use each stem may extend outwardly from said bore's end;
one of the projecting ends of the stem of the T comprising a longitudinal extending part which is retained within an accommodating passage of the piston, and a lateral cross member associated with said longitudinal extending part which extends through a transverse passage located within said piston rod and spaced therefrom with the ends of said lateral cross member being associated with an external collar surrounding the piston rod wherein said lateral cross member may impact against said transverse passage to thereby open a proximal access port when said external collar abuts a rod bush or wall of said hydraulic ram assembly;
a pair of balls in said valve chamber separate from the valve members wherein, in use, each ball is held in abutting relationship with an adjacent head portion of a respective valve member, and a biassing member interposed between each of said balls in the valve chamber whereby each valve member is biassed outwardly to a closed and seated position, the construction and arrangement being such that each valve member may close or open a respective fluid access port to fluid flow through the valve chamber whereby in operation fluid flow into said chamber may occur only from the pressure side of the piston or piston rod accommodating said valve through said proximal access port wherein a distal access port is closed and whereby in response to said outwardly extended stem and prior to impact of said piston or piston rod upon an internal surface of the hydraulic ram assembly, said distal access port is opened to permit fluid flow to occur therethrough to the non-pressure side of the piston or piston rod from the valve chamber.

* * * * *